US012722297B2

(12) United States Patent
Shimizu et al.

(10) Patent No.: US 12,722,297 B2
(45) Date of Patent: Sep. 1, 2026

(54) ROBOT DATA PROCESSING SERVER AND INTERFERENCE DATA PROVISION METHOD

(71) Applicant: KAWASAKI JUKOGYO KABUSHIKI KAISHA, Kobe (JP)

(72) Inventors: Shoji Shimizu, Kobe (JP); Fumihiro Honda, Kobe (JP); Ryusuke Taniguchi, Kobe (JP); Toshihiko Miyazaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 17 days.

(21) Appl. No.: 18/702,385

(22) PCT Filed: Oct. 21, 2022

(86) PCT No.: PCT/JP2022/039222
§ 371 (c)(1),
(2) Date: Apr. 18, 2024

(87) PCT Pub. No.: WO2023/068354
PCT Pub. Date: Apr. 27, 2023

(65) Prior Publication Data

US 2025/0010471 A1 Jan. 9, 2025

(30) Foreign Application Priority Data

Oct. 22, 2021 (JP) ................................ 2021-172880

(51) Int. Cl.
*B25J 9/16* (2006.01)
*G05B 19/4155* (2006.01)

(52) U.S. Cl.
CPC ........... *B25J 9/1666* (2013.01); *B25J 9/1605* (2013.01); *G05B 19/4155* (2013.01); *G05B 2219/50391* (2013.01)

(58) Field of Classification Search
CPC ...... B25J 9/1666; B25J 9/1656; B25J 9/1605; G05B 2219/39298; G05B 19/4155
See application file for complete search history.

(56) References Cited

U.S. PATENT DOCUMENTS

2011/0054685 A1* 3/2011 Wada .................... B25J 9/1664 700/252
2013/0310977 A1* 11/2013 Tsusaka ................ B25J 9/1656 700/257
(Continued)

FOREIGN PATENT DOCUMENTS

EP 3 578 322 A1 12/2019
JP 2017-199077 A 11/2017
(Continued)

OTHER PUBLICATIONS

Dec. 27, 2022 Search Report issued in International Patent Application No. PCT/JP2022/039222.

*Primary Examiner* — Wade Miles
*Assistant Examiner* — Mohammed Yousef Abuelhawa
(74) *Attorney, Agent, or Firm* — Oliff PLC

(57) ABSTRACT

A server includes a communication device and a storage device. The communication device receives the interference data from the client device connected via the wide area network. The interference data is data which associates teaching point candidates indicating candidates for the teaching points of the industrial robot with interference results indicating whether or not the robot interferes with surrounding objects when the position and posture of the robot is aligned with the teaching point candidate. The storage device stores the interference data received by the communication device.

8 Claims, 7 Drawing Sheets

(56) References Cited

U.S. PATENT DOCUMENTS

| | | | | |
|---|---|---|---|---|
| 2015/0314438 | A1 | 11/2015 | Namba et al. | |
| 2016/0016311 | A1* | 1/2016 | Konolige | B25J 9/1612 901/30 |
| 2016/0151913 | A1* | 6/2016 | Nagatsuka | B25J 9/1664 700/254 |
| 2017/0252922 | A1* | 9/2017 | Levine | B25J 9/1612 |
| 2017/0308052 | A1 | 10/2017 | Kajiyama | |
| 2019/0224842 | A1* | 7/2019 | Kishi | B25J 13/06 |
| 2020/0023516 | A1* | 1/2020 | Kato | B25J 9/1664 |

FOREIGN PATENT DOCUMENTS

| | | | |
|---|---|---|---|
| JP | 2019-81204 | A | 5/2019 |
| JP | 2020-196102 | A | 12/2020 |
| WO | 2013/150597 | A1 | 10/2013 |

* cited by examiner

FIG. 4
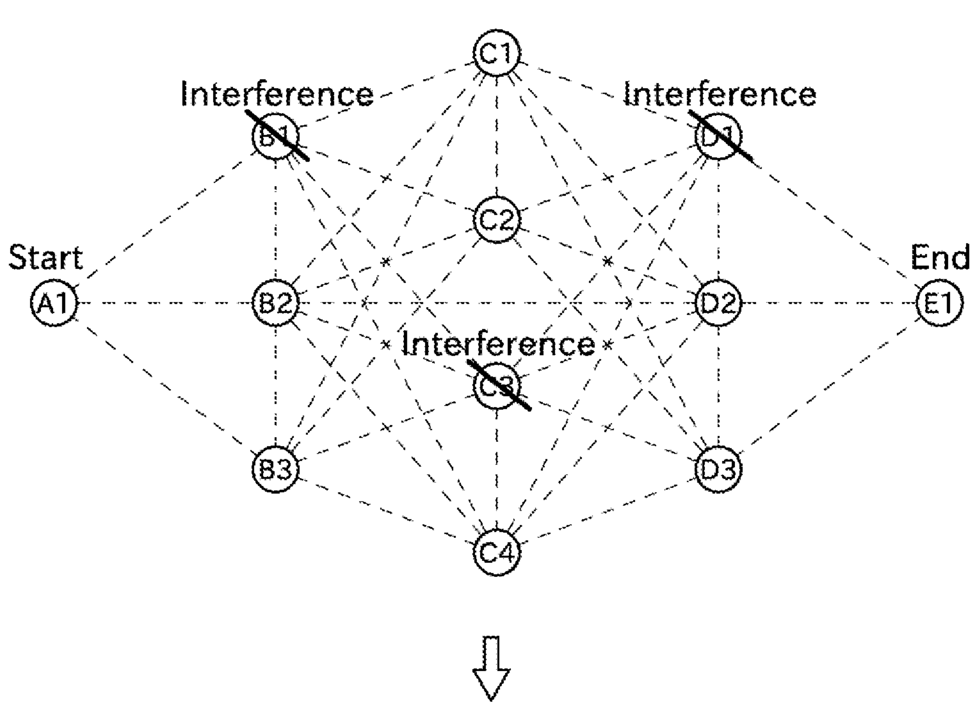
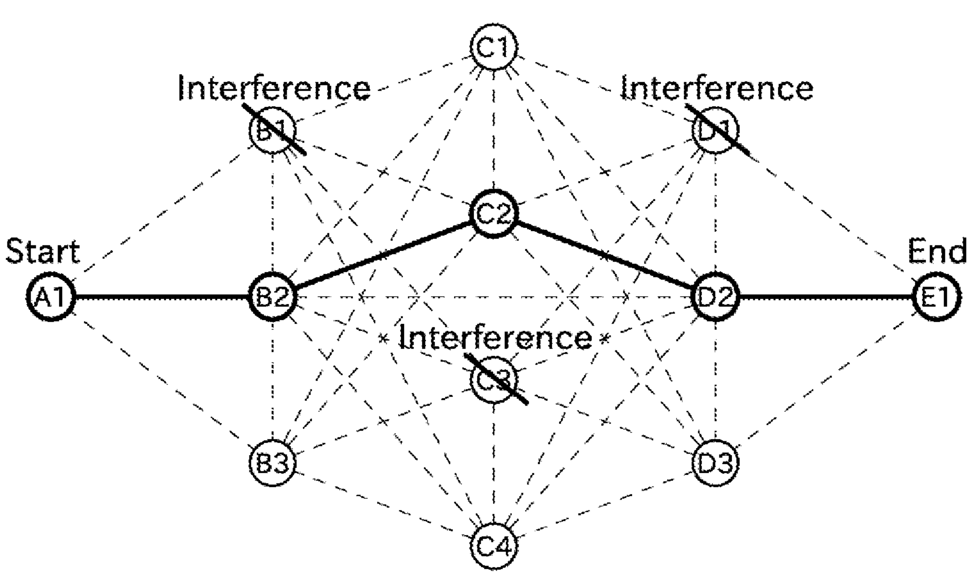

FIG. 5
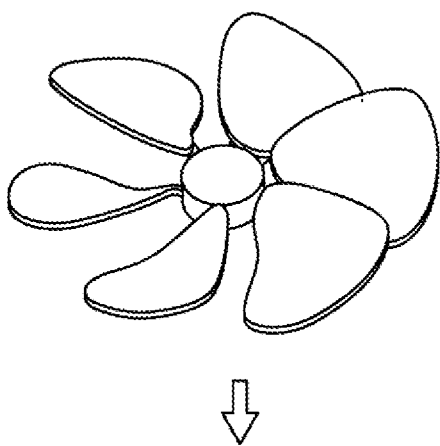
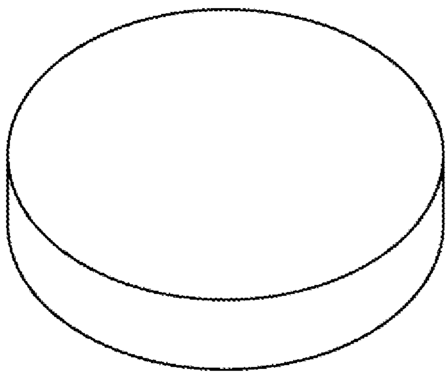

FIG. 6

| Work Quality Data | | |
|---|---|---|
| Work Class A | Operation Path X (Teaching Point A1, Teaching Point B1,...) | Evaluation Value:5 |
| Work Class A | Operation Path Y (Teaching Point A1, Teaching Point B1,...) | Evaluation Value:6 |
| Work Class B | Operation Path X (Teaching Point A1, Teaching Point B1,...) | Evaluation Value:4 |
| Work Class B | Operation Path Z (Teaching Point A1, Teaching Point B1,...) | Evaluation Value:6 |
| ⋮ | ⋮ | ⋮ |

Machine Learning

Operation Path Model when model is created

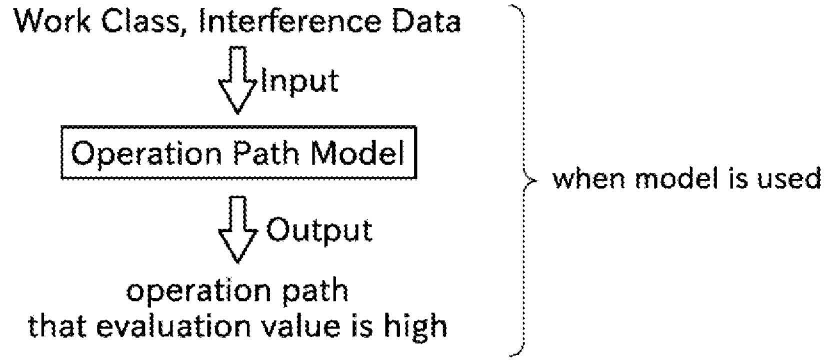

ROBOT DATA PROCESSING SERVER AND INTERFERENCE DATA PROVISION METHOD

TECHNICAL FIELD

The present invention relates primarily to a robot data processing server for processing data on an industrial robot.

BACKGROUND ART

Patent Literature 1 (PTL 1) discloses a production system including more than one industrial machines that operate in accordance with an operation program. The operation of the production system is optimized by a cell controller. More specifically, the cell controller analyzes what has an adverse effect on a tact time of the production system based on time-series running information obtained from the production system, and improves the operation program. The information obtained by the cell controller is transmitted to a cloud server. This allows the information to be shared among two or more cell controllers. PTL 1 also mentions an industrial robot as an example of the industrial machine.

CITATION LIST

Patent Literature

PTL 1: Japanese Patent Application Laid-Open No. 2017-199077

SUMMARY OF INVENTION

Technical Problem

Data created or used in a workshop regarding an industrial robot may include highly confidential data. For example, three-dimensional data such as a workshop or a workpiece includes detailed shapes and the like, and therefore may be highly confidential. Therefore, it may not be preferable to transmit and store this such data in a cloud server as disclosed in PTL 1. On the other hand, by sending such data to the cloud server and storing such data, it may be preferable that the cloud server perform some processing, or devices can access such data from multiple locations, so it is convenient in terms of convenience. As a result of the above, security and convenience cannot be compatible at the same time, and improvements have been required.

The present invention has been made in view of the circumstances described above, and aims primarily to provide mechanism that improves convenience while maintaining security by transmitting and storing data regarding an industrial robot to a server.

Solution to Problem

The foregoing has described problems to be solved by the present invention. The following will describe solutions to the problems and advantageous effects thereof.

A first aspect of the present invention provides a robot data processing server configured as follows. The robot data processing server includes a communication device and a storage device. The communication device receives interference data from an external device connected via wide area network. The interference data being data which associates teaching point candidates indicating candidates for teaching points of an industrial robot with interference results indicating whether or not the robot interferes with surrounding objects when a position and posture of the robot is aligned with the teaching point candidates. The storage device stores the interference data received by the communication device.

A second aspect of the present invention provides a interference data provision method. In the method, interference data that is data which associates teaching point candidates indicating candidates for teaching points of an industrial robot with interference results indicating whether or not the robot interferes with surrounding objects when a position and posture of the robot is aligned with the teaching point candidate is created. The created interference data is transmitted to a robot data processing server via a wide area network.

Advantageous Effect of Invention

According to the present invention, convenience can be improved while maintaining security by transmitting and storing data regarding an industrial robot to a server.

DESCRIPTION OF EMBODIMENTS

The following will describe, with reference to the drawings, an embodiment of the present invention. First, referring to FIG. 1, an outline of a robot service provider system 1 will be described.

The robot service provider system 1 is a system that aggregates information provided by companies involved in an industrial robot, and provides various services to the respective companies.

The industrial robot refers to a robot that works at a workshop in a factory, a warehouse, or the like. The industrial robot is of teaching playback type. The teaching playback type means: teaching in advance an operation of the industrial robot; and having the industrial robot repeat the same operation in accordance with what has been taught. The industrial robot is, for example, a vertical-articulated or horizontal-articulated arm robot. The robot service provider system 1 is applicable to a robot other than arm robots, such as a parallel link robot. Examples of works performed by the industrial robot include assembling, welding, coating, machining, or transporting. Hereinafter, the industrial robot will be simply referred to as "robot."

Figure 1:
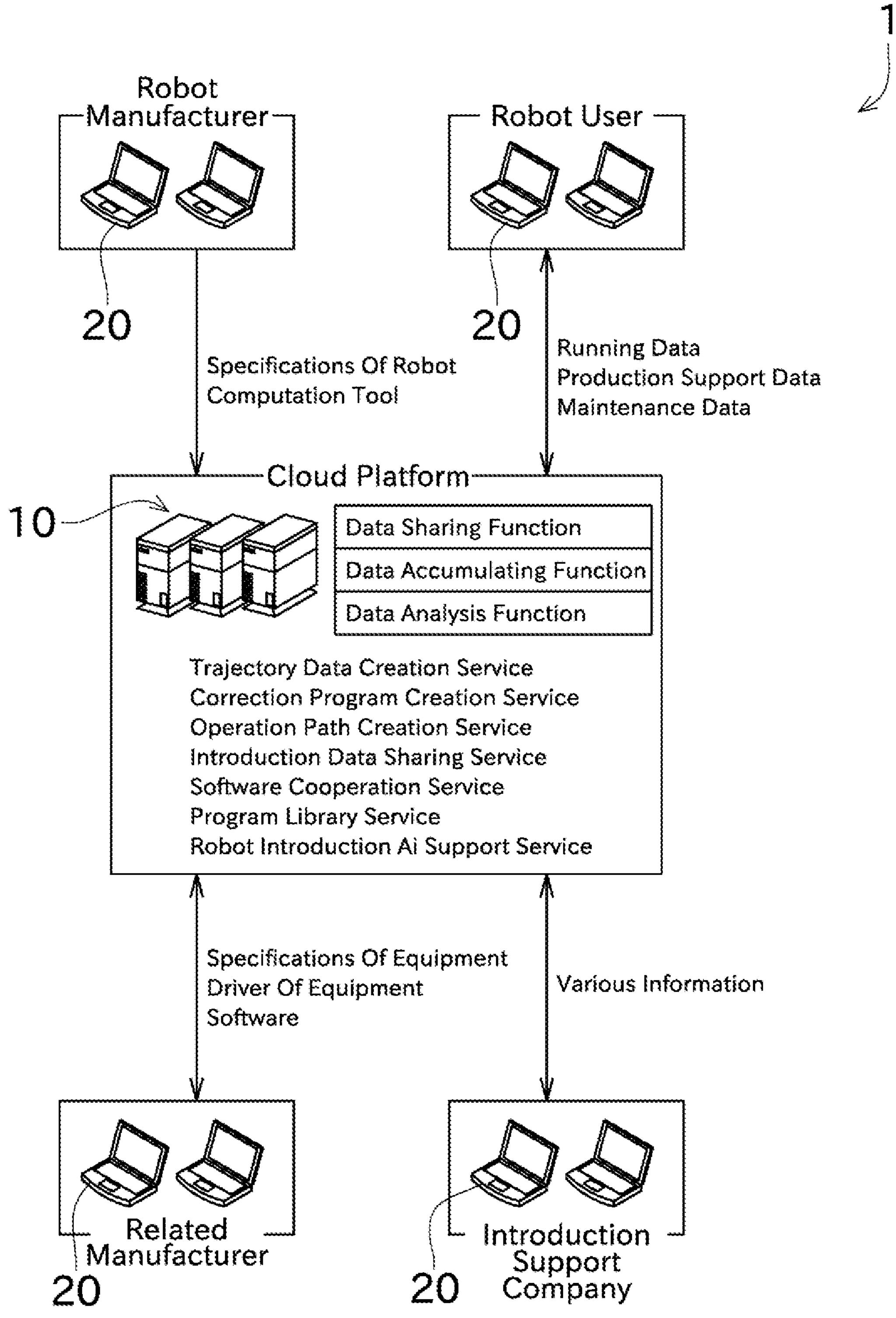
FIG. 1 An outline drawing showing a robot service provider system

As shown in FIG. 1, the companies involved in the industrial robot include a robot manufacturer, a robot user, a related manufacturer, an introduction support company, and the like. The robot manufacturer develops, manufactures, and maintains the robot. The robot user introduces the robot to its own workshop, and makes the robot work. The related manufacturer is, for example, a manufacturer for manufacturing peripheral equipment such as a work tool or a sensor. The related manufacturer may encompass a manufacturer that provides software for teaching or managing the robot, for example. The introduction support company, which is a so-called system integrator, supports the robot user in introducing the robot. To be specific, the introduction support company selects a robot suitable for the workshop of the robot user, teaches the robot, or suggests a change for the better after the introduction, for example.

As shown in FIG. 1, the robot service provider system 1 includes a server 10 and client devices 20.

The server 10 and the client devices 20 are at different locations. The server 10 and the client devices 20 are mutually communicable via a wide area network. The wide area network is the Internet for example, but may be something other than the Internet. Examples of the something other than the Internet include a network in which local area networks at different locations are connected by a dedicated line.

The server 10 is a robot data processing server, which aggregates information relating to the robot, and provides later-described services to the respective companies. The server 10 is installed in a data center, for example. The server 10 may be a single piece of hardware, or may be composed of two or more pieces of hardware in cooperation with each other. For example, a piece of hardware that aggregates and stores information may be separate from a piece of hardware that executes a process in accordance with a request from the client device 20. The server 10 may be implemented by a cloud computing service.

The client devices 20 are installed in the robot manufacturer, the robot user, the related manufacturer, and the introduction support company, respectively. The client devices 20 are general-purpose PCs, on which software for using the robot service provider system 1 is installed. This software will hereinafter be called a "robot running support application." The client devices 20 do not always have to be general-purpose PCs, but may be dedicated products exclusively for use of the robot service provider system 1. The client devices 20 do not always have to be PCs, but may be tablet devices or smartphones. The client devices 20 may be installed with software different from the robot running support application, which more specifically is teaching software provided by the related manufacturer.

In the following, descriptions will be given in a simplified fashion: for example, the client device 20 provided in the robot manufacturer transmitting data to the server 10 is expressed as the robot manufacturer transmitting data to the server 10.

Information transmitted and received in the robot service provider system 1 will now be described. The information illustrated below is just an example, and information other than the below-described one may be transmitted and received.

The robot manufacturer transmits to the server 10 a computation tool and specifications of the robot that the robot manufacturer manufactures, for example. The specifications of the robot include the size of the robot, a movable range of an arm, a speed range of the arm, and the like. The specifications of the robot are transmitted in association with a model type of the robot. The computation tool is, for example, software that makes the robot operate in accordance with an operation program, or software for teaching the robot.

The robot user transmits to the server 10 data accumulated through running of the robot. The data include, for example, the operation of the robot in accordance with the operation program, a cycle time, or a location where a failure occurs. The robot user is capable of receiving production support data from the server 10. The production support data are data that are used when the robot is introduced or operated, and the production support data are data relating to the peripheral equipment or the work tool, or are a program necessary to introduce the robot or to add a work, for example.

The related manufacturer transmits to the server 10 specifications of the peripheral equipment of the robot, a driver of the peripheral equipment, a program for linking the peripheral equipment to the robot, or software. The related manufacturer, when the driver or the software is updated, transmits an update file to the server 10.

The introduction support company receives various data that the server 10 has received from other companies. The introduction support company can make use of these data when supporting the robot user in introducing the robot.

Services provided by the robot service provider system 1 will be briefly described below.

The server 10 provides a virtual place serving as a cloud platform, to facilitate collaboration of companies. The server 10 has a data sharing function, a data accumulating function, and a data analysis function. The data sharing function is a function that allows data received by the respective companies to be shared among the companies. The data sharing function is a function that allows data received by the respective companies to be shared among the companies. The data analysis function is a function for analyzing data accumulated by the data accumulating function, and creating new information. The analysis of data is preferably carried out by using an AI, for example. The robot service provider system 1 provides services through these functions.

Services that the robot service provider system 1 provides in an introduction of the robot include a trajectory data creation service, a correction program creation service, an operation path creation service, an introduction data sharing service, a software cooperation service, a program library service, and a robot introduction AI support service. Each company receives these services through the robot running support application installed on its client device 20.

The trajectory data creation service is a service of the server 10 creating trajectory data. First, the robot user or the introduction support company transmits an operation program to the server 10. The server 10 creates trajectory data for the received operation program, and transmits the trajectory data to the robot user or the introduction support company. The operation program is data in which operations to be performed by the robot are described in a sequential order. To be specific, the operation program includes a teaching point at which the robot is to be positioned, and the speed and acceleration of movement of the arm. In a case where an operation of the robot is triggered by an operation of another device, the operation program includes a condition related to an operation timing. The trajectory data are operations of the robot from one time to another. Use of data accumulated in the server 10 allows the trajectory data to be calculated with a high accuracy.

The correction program creation service is a service of the server 10 creating a correction program. First, the robot user or the introduction support company transmits a teaching point and a work class to the server 10. The work class refers to a kind of the work performed by the robot, such as assembling or welding. In a case of the welding, it may be possible to further set a kind of the welding, a kind of a workpiece, or the like. The server 10 creates a correction program based on the teaching point and the work class received, and transmits the correction program to the robot user or the introduction support company. The correction program is a program used to correct an error between an actual work and a teaching. Use of data accumulated in the server 10 makes it possible to propose an appropriate correction method to the robot user or the introduction support company.

The operation path creation service is a service of the server 10 creating an operation path. First, the robot user or the introduction support company creates interference data. The interference data are data in which plural teaching points are each associated with whether or not the robot interferes with another object when the position and posture of the robot are aligned to a teaching point candidate. The robot user or the introduction support company transmits the interference data to the server 10. The server 10 creates an operation path based on the interference data. The operation path is data in which teaching points of the robot are sequenced in time series. Use of data accumulated in the server 10 allows creation of an appropriate operation path. Details of the operation path creation service will be given later.

The introduction data sharing service is a service that facilitates sharing of introduction data among companies, the introduction data being used when the robot is introduced to the robot user. The introduction data include data on the workshop of the robot user, data on the workpiece, data on work details, data on the operation program, a control program for the peripheral equipment, or the like. The introduction data are saved in the server 10, and are accessed by the robot user or the introduction support company. Consequently, sharing of the introduction data is facilitated.

The software cooperation service is a service that enables pieces of software provided by various companies to cooperate together. The server 10 runs a piece of software provided by the robot manufacturer in cooperation with a piece of software provided by the related manufacturer. In this manner, the robot and the peripheral equipment can be linked easily. Linking a piece of teaching software provided by the robot manufacturer to a piece of teaching software provided by someone other than the robot manufacturer allows an effective use of the advantages of the two kinds of teaching software.

The program library service is a service that stores programs provided by various companies as a library so that they can be shared among the companies. For example, to create an operation program that needs use of a special work tool or an operation program that needs sensing, a force sense control, or the like, a skill is required. In this respect, by the program library service, an operation program that can be used for general purposes is stored as a library in the server 10. This enables the robot user or the introduction support company to easily create the above-mentioned kinds of operation programs.

The robot introduction AI support service is a service for supporting an introduction of the robot by using an AI when the robot user introduces the robot. As described above, when the robot user introduces the robot, the robot service provider system 1 provides various services to the robot user. The server 10 accumulates data obtained in providing the services, and analyzes the data. More specifically, the server 10 makes the data machine-learned. Accordingly, when a new robot user introduces the robot, a proposal can be made to the new robot user based on a tendency of the robot model type, the peripheral equipment, the operation program, or the like, adopted by previous robot users.

Functions that the robot service provider system 1 has in order to appropriately supply the foregoing services will now be briefly described.

Data shared in the server 10 include highly confidential data. For example, data on the workshop of the robot user and data on the workpiece can sometimes be highly confidential. Shared data may possibly include customer information and technology information of each company. This is why the robot service provider system 1 has a security function for preventing leakage of highly confidential data.

In some case, the robot running support application may be used to build a virtual environment including a workshop, a workpiece, a robot, and the like, for observation of an introduction of the robot or running of the robot. In this case, it is preferable that the virtual environment on the robot running support application is always kept coincident with an environment of an actual machine in the workshop. This is why the robot running support application has a function for enabling the virtual environment to be built or updated easily.

The robot service provider system 1 provides a wide variety of services. These services are provided through the robot running support application. The robot running support application, therefore, has a user interface that can facilitate performing functions desired by an operator.

The server 10 accumulates various data. If, for example, all of data about the introduction of the robot are transmitted to the server 10, not only the security problem mentioned above but also a problem of an enlarged communication data amount and an enlarged server capacity can arise. The robot service provider system 1, therefore, has a function for extracting only data related to providing of services and/or for reducing the size of data not related to providing of services, instead of transmitting all of the data about the introduction of the robot.

Figure 2:
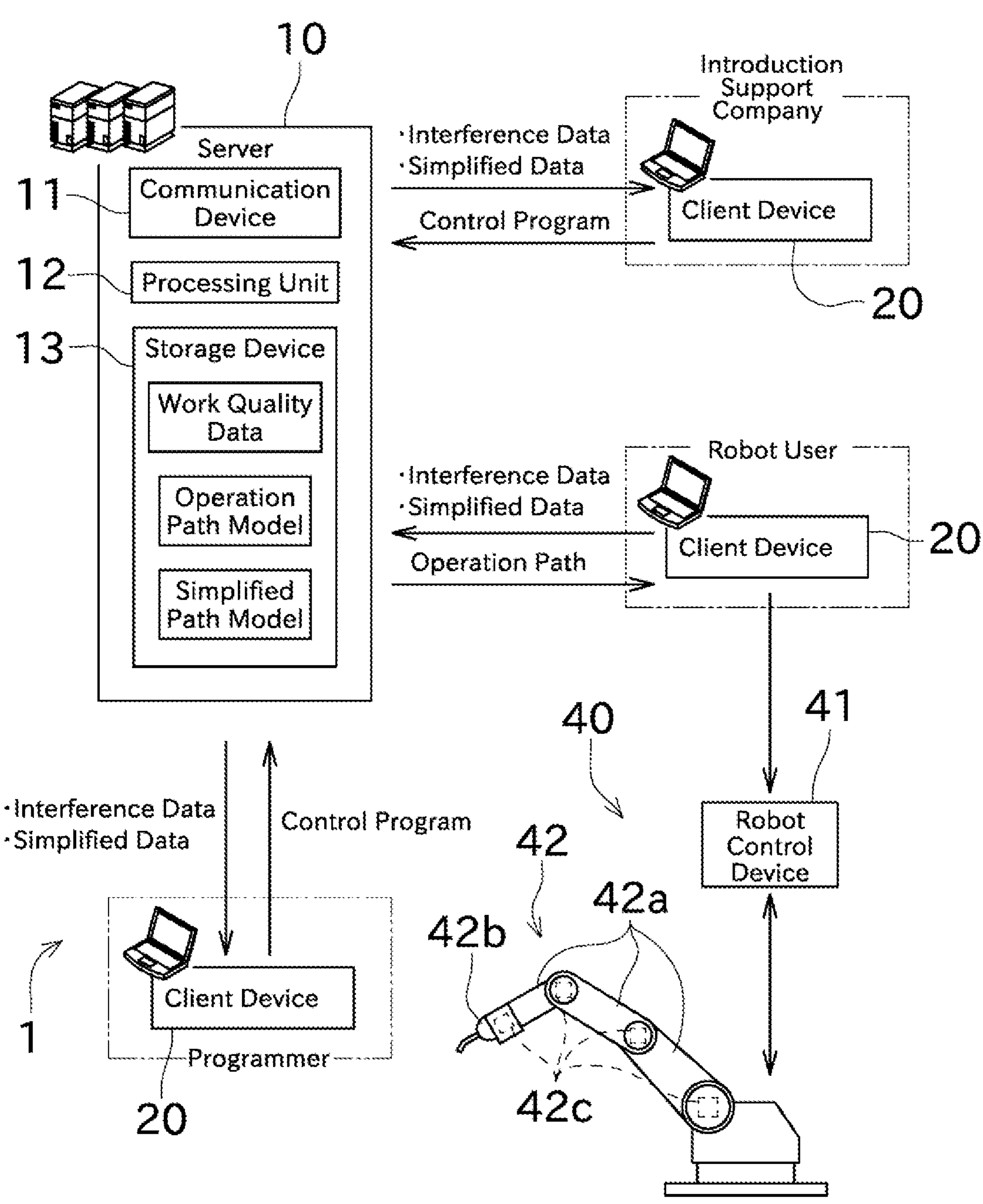
FIG. 2 A block diagram showing a server, a client device, and a robot system FIG. 3 A sequence diagram of operation path creation service FIG. 4 An diagram for the explanation conceptually showing an interference map and an operation path FIG. 5 A model diagram showing three-dimensional data and simplified data of a workpiece FIG. 6 A diagram for the explanation of creation and use of an operation path model FIG. 7 A sequence diagram in which interference data and simplified data are shared among multiple locations to perform a collaborative work.

Configurations of the server 10, the client device 20, and a robot system 40 will now be described with reference to FIG. 2.

The server 10 includes a communication device 11, a processing unit 12, and a storage device 13. The communication device 11, which for example is a communication module, communicates with the client device 20, or the like, as an external device. The processing unit 12, which for example is a CPU, executes various processes by executing a program. The storage device 13, which is a hard disk or an SSD, stores various data including the foregoing program. The processes performed by the processing unit 12, and the data stored in the storage device 13 will be detailed later.

The client device 20 is provided in each of the companies, and is installed with the robot running support application, as described above. The client device 20, like the server 10, includes a communication device, a processing unit, and a storage device. The client device 20 further includes a display device and an input device. The display device, which is a liquid crystal display or an organic electroluminescent display, displays an image created by the processing unit. The input device, which is a mouse, a keyboard, a touch panel, or the like, receives a human operation.

The client device 20 transmits to the robot system 40 an operation program that the client device 20 has created or an operation program that the client device 20 has received from the server 10. The robot system 40 includes a robot control device 41 and a robot 42.

The robot control device 41 includes a processing unit such as a CPU, and a storage device such as a hard disk, an SSD, or a flash memory. The processing unit executes a program stored in the storage device, to control the robot 42.

The robot 42 includes plural arms 42*a*, a work tool 42*b*, and sensors 42*c*. The arms 42*a* are individually operated by power of an actuator such as a motor. The work tool 42*b* performs a work on a workpiece. The work tool 42*b* is, for example, a hand for holding the workpiece, or a welding torch for welding the workpiece. The sensors 42*c* detect the rotation angles of the respective arms 42*a*, and output detection results to the robot control device 41.

With the above-described configuration, the robot control device 41 controls the actuator based on the operation program and the rotation angles detected by the sensors 42*c*, to operate the arms 42*a* and/or to make the work tool 42*b* perform the work.

The operation path creation service will now be described in detail with reference to FIG. 3 to FIG. 6.

The operation path creation service is used by a person belonging to the robot user or the introduction support company. Hereinafter, users of the operation path creation service will be simply referred to as users. The operation path creation service is, as mentioned above, a service in which the server 10 creates the operation path based on the interference data that the client device 20 transmits, and transmits the operation path to the client device 20.

As described above, the operation path is data in which teaching points of the robot are sequenced in time series. The operation path is simply a sequence of the teaching points for positioning the robot 42 in the order in which the robot 42 is to be positioned, and so no time elapsed between the teaching points, etc. is set. Even if the robot 42 begins to operate an operation of another device as a trigger, information indicating the operation timing is not included in the operation path. In other words, the operation path is one of the materials for creating a operation program.

The operation path described below is a path for moving the robot 42 from a start position where the robot 42 finishes working at a first working location to a destination position where the robot 42 starts working of a second working location. In other words, the operation path in this embodiment can take any path from the start position to the destination position as long as there is no interference with other objects. The operation path may be a path during work by the robot 42. For example, the operation path may be a path from the start position for grasping the workpiece to the destination position for transferring the workpiece to another device.

First, the client device 20 creates the interference data (sequence number S1). The interference data are data in which a plurality of teaching point candidates are each associated with whether or not the robot 42 interferes with another object when the position and posture of the robot 42 are aligned to the teaching point candidate. The position and posture of the robot 42 are, for example, the position of the robot 42, the rotation angle of each arm 42*a*, the position of the work tool 42*b*, the posture of the work tool 42*b*, and the like. FIG. 4 shows a diagram illustrating the concept of interference data. One circle shown in FIG. 4 is one teaching point candidate. The teaching point candidate labeled AI is the start position, and the teaching point candidate labeled E1 is the destination position. The teaching point candidates labeled with symbols Bn, Cn, and Dn (n is an integer) are intermediate positions from the start position to the destination position. The positions are in the order of symbols Bn, Cn, and Dn, which are closest to the start position. Information regarding whether or not the robot 42 will interfere with another object is shown for each teaching point candidate. In this embodiment, the teaching point candidates are classified into B, C, and D according to the distance to the start position, but this classification is just an example. For example, instead of the classification of this embodiment, the teaching point candidates may be classified from another viewpoint, or the teaching point candidate classification may be omitted.

The interference data may be created manually by the operation of the client device 20 by the user, or may be created by the client device 20 by inputting necessary information into the client device 20. Regardless of which method is used to create interference data, first, three-dimensional data of the workshop, three-dimensional data of the robot 42, and three-dimensional data of the workpiece are arranged in a virtual space using the robot running support application on the client device 20. The three-dimensional data of the workshop is three-dimensional data of objects such as walls, shelves, peripheral equipment, etc. arranged in the workshop. When a plurality of robots 42 are arranged side by side to perform work, the other robots 42 may be included in the three-dimensional data of the workshop. Next, the teaching points for work location of the robot 42 are created. The teaching points of the work locations are teaching points when the robot 42 performs work, for example, teaching points of the robot 42 when spraying paint when the robot 42 performs painting. In this embodiment, teaching points for two work locations are created at this stage, and a operation path between them is created using the operation path creation service.

When the user manually creates the interference data, the user creates a plurality of teaching point candidates located between the last teaching point of the first work location and the initial teaching point of the second work location. The user checked whether or not the robot 42 interferes with other objects when the robot 42 is aligned with the position and orientation indicated by the teaching point candidate. If the robot 42 interferes with another object, information indicating that interference has occurred is added to the teaching point candidate, and if the robot 42 does not interfere with another object, information indicating that no interference has occurred is added to the teaching point candidate. As described above, the interference data can be created manually.

When the interference data is created by the client device 20, the client device 20 creates a plurality of teaching point candidates located between the last teaching point of the first work location and the initial teaching point of the second work location based on the three-dimensional data of the objects and the teaching points of the work location described above. The client device 20 checked whether or not the robot 42 interferes with other objects when the robot 42 is aligned with the position and orientation indicated by the teaching point candidate. As in the case of the manual operation, if the robot 42 interferes with another object, information indicating that interference has occurred is added to the teaching point candidate, and if the robot 42 does not interfere with another object, information indicating that no interference has occurred is added to the teaching point candidate. As described above, the interference data can be created by the client device 20.

To check whether interference will occur when the robot 42 is operated, the three-dimensional data of the workshop and the workpiece is generally required in addition to the data of the robot 42. However, the three-dimensional data of the workshop and the workpiece may contain highly confidential information. Therefore, it may not be preferable to transmit the three-dimensional data of the workshop and the workpiece to the server 10 or to share the data with other locations via the server 10. Furthermore, since the three-dimensional data of the workshop and the workpiece has a large amount of data, the amount of communication data when transmitting the data to the server 10 becomes large. In this regard, in this embodiment, three-dimensional data of the workshop and the workpiece is not transmitted, but interference data is transmitted instead. By using the interference data, information regarding interference can be shared, improving convenience. Since the three-dimensional shapes of the workshop and workpiece cannot be estimated from the interference data, it is possible to suppress a decrease in security.

Next, the client device 20 creates the simplified data (sequence number S2). The simplified data is data obtained by simplifying the three-dimensional data of the workshop or the three-dimensional data of the workpiece. In this specification, three-dimensional data indicating a detailed shape used for design etc. is simply referred to as "three-dimensional data", and data that is simplified is referred to as "simplified data" to distinguish between the two data.

Simplification means simplifying the outline of the three-dimensional data. In other words, the three-dimensional data is replaced with a simple figure or a combination thereof while maintaining its general shape. A simple figure is, for example, a figure obtained by stretching a polygon or a circle in the normal direction, or a rotating body obtained by rotating a polygon or a circle around a predetermined axis of rotation. FIG. 5 shows a specific example of the simplified data. The client device 20 creates cylindrical simplified data by simplifying the three-dimensional data of the blower blades.

The simplified data is used in place of the three-dimensional data in various work related to the introduction of the robot 42. For example, the simplified data may be used for interference confirmation. Therefore, in this embodiment, when the three-dimensional data and the simplified data are superimposed, the simplified data encompasses the three-dimensional data. In other words, the three-dimensional data does not extend beyond the simplified data. By setting the teaching points so that the robot 42 does not interfere with the simplified data, the robot 42 also does not interfere with the three-dimensional data.

The simplified data does not include detailed shapes like the three-dimensional data. Therefore, by transmitting the simplified data to the server 10 instead of the three-dimensional data, it is possible to suppress a decrease in security. Creating and transmitting the simplified data to the server 10 are not essential and can be omitted.

The client device 20 transmits a work class, the interference data, and the simplified data to the server 10 (sequence number S3). The work class is the type of work performed by the robot 42, as described above. The work class is specified and stored in the client device 20, for example, at or before creating the interference data. In response to this, the server 10 stores the interference data and the simplified data in the storage device 13 (sequence number S4). Although details will be described later, the interference data and the simplified data can also be transmitted to another authenticated client device 20.

Next, the server 10 creates the operation path based on the interference data and the operation path model (sequence number S5). Since the operation path is a path in which the teaching points are sequenced in time series, as shown in FIG. 4, the operation path can be created by connecting the teaching point candidates that is no interference among the interference data. Since the quality of the work varies depending on the combination of the connected teaching point candidates, the server 10 creates the operation path that combines the optimal teaching point candidates. At the bottom of FIG. 4, it is shown that the operation path is created by selecting and connecting one each of the teaching point candidates Bn, Cn, and Dn. There are various methods for creating the operation path. For example, a plurality of teaching point candidates of the same section may be selected, such as connecting the teaching point candidate B3 after the teaching point candidate B2. The selection of teaching point candidates in a specific section may be omitted, such as connecting the teaching point candidate with symbol D2 to the teaching point candidate with symbol B2.

In this embodiment, the server 10 creates the operation path using the operation path model. The operation path model is a model that is constructed by machine learning of work quality data, as shown in FIG. 6. The work quality data is data that classifies and stores works of the robot 42 that have been performed in the past. Specifically, the work quality data is data that associates work classes, operation paths, and evaluation value with each other.

The operation path means a path of the operation of the robot 42 that has been executed in the past. The evaluation value is a value indicating how highly evaluated the operation of the robot 42 is. For example, the shorter the operation time, the higher the evaluation value. When the work class is transport, the evaluation value becomes higher as the operation path is less likely to cause acceleration or deceleration. When the robots 42 are arranged closely together in the work class, the smaller the trajectory along which the arm 42*a* moves, the higher the evaluation value. In other words, the evaluation value is a numerical value indicating the degree of work quality. By performing machine learning of the work quality data, it is possible to recognize correlations between the work class, the operation path, and the evaluation value. In other words, it is possible to construct the operation path model on the tendency for the evaluation value to become high when what operation path is selected for what kind of work class. The machine learning performed here is learning to construct a method to maximize the evaluation value, and corresponds to reinforcement learning.

As shown in FIG. 6, when using the operation path model, the work class and the interference data are input into the operation path model. The output of the operation path model is the operation path with the high evaluation value. As described above, since the operation path model has a method for maximizing the evaluation value, the operation path outputs the combination of the teaching point candidates having the highest evaluation value among the combinations of teaching point candidates that do not cause interference based, in other words the operation path is output. In this embodiment, one operation path estimated to have the highest evaluation is output, but a plurality of operation paths may be output.

Robot data may be used when calculating the operation path. The robot data is data that associates specifications of the robot 42 with the model type of the robot 42. By using the robot data, the operation of the robot 42 can be specified in more detail, so a more appropriate operation path can be created. If the robot data is used, the model type of the robot is further transmitted from the client device 20 to the server 10 at sequence number S3.

It is not essential to include the work class in the work quality data, and the work class may be omitted from the machine learning target. In this case, operations that have a high evaluation value common to all work classes, such as operations with short operation times, are output. Alternatively, another item may be added to the machine learning target. It is not essential to perform machine learning to construct the operation path model, and the operation path may be created based on analysis results of work quality data. For example, the operation path can be created by preferentially using a combination of teaching points that is used at a high rate in the work quality data.

Next, the server 10 transmits the created operation path to the client device 20 (sequence number S6). The client device 20 creates an operation program based on the operation path received from the server 10 (sequence number S7). Since the operation path received from the server 10 has high work quality, the operation program created based on the operation path also has high work quality.

Next, another aspect of using the interference data and the simplified data will be described with reference to FIG. 7.

Figure 3:
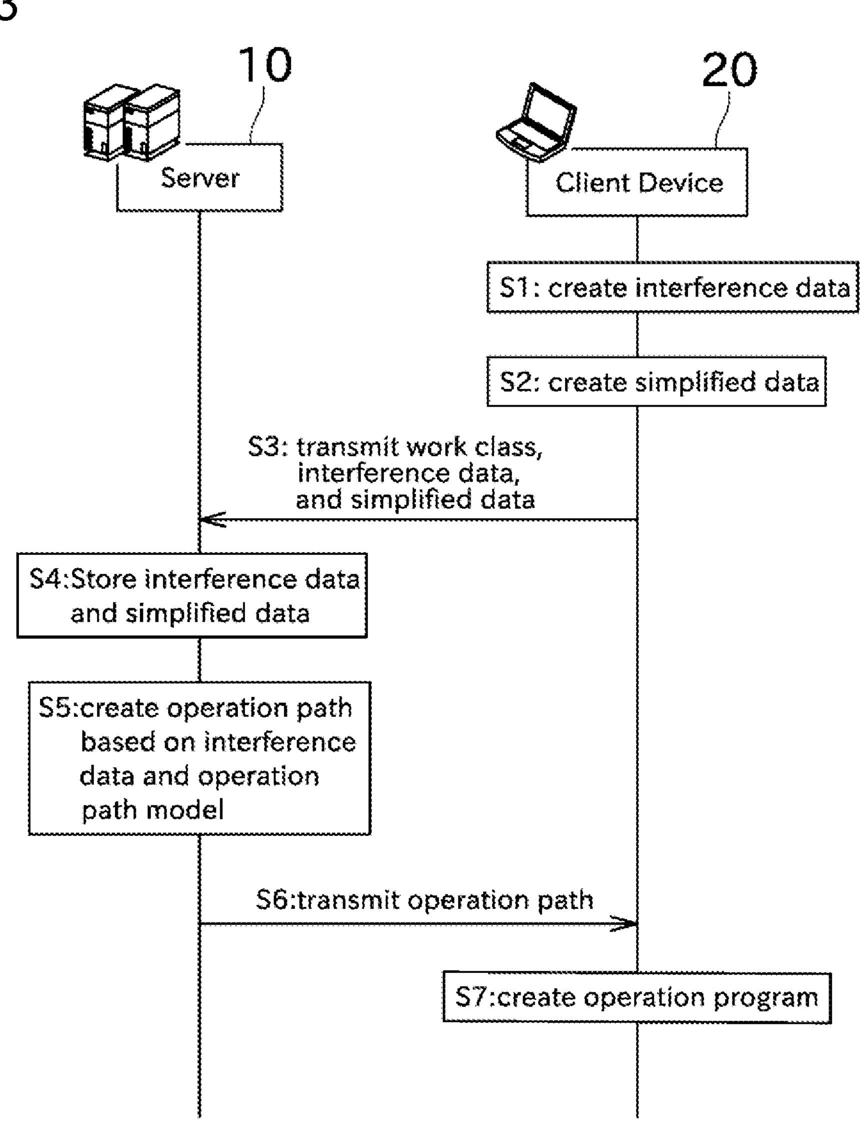

In the sequence diagram of FIG. 3, the server 10 creates the operation path, and the client device 20 creates the operation program based on the operation path. On the other hand, in the sequence diagram of FIG. 7, the server 10 make a plurality of client devices 20 share the interference data and the simplified data. The specific details will be explained below.

Figure 7:
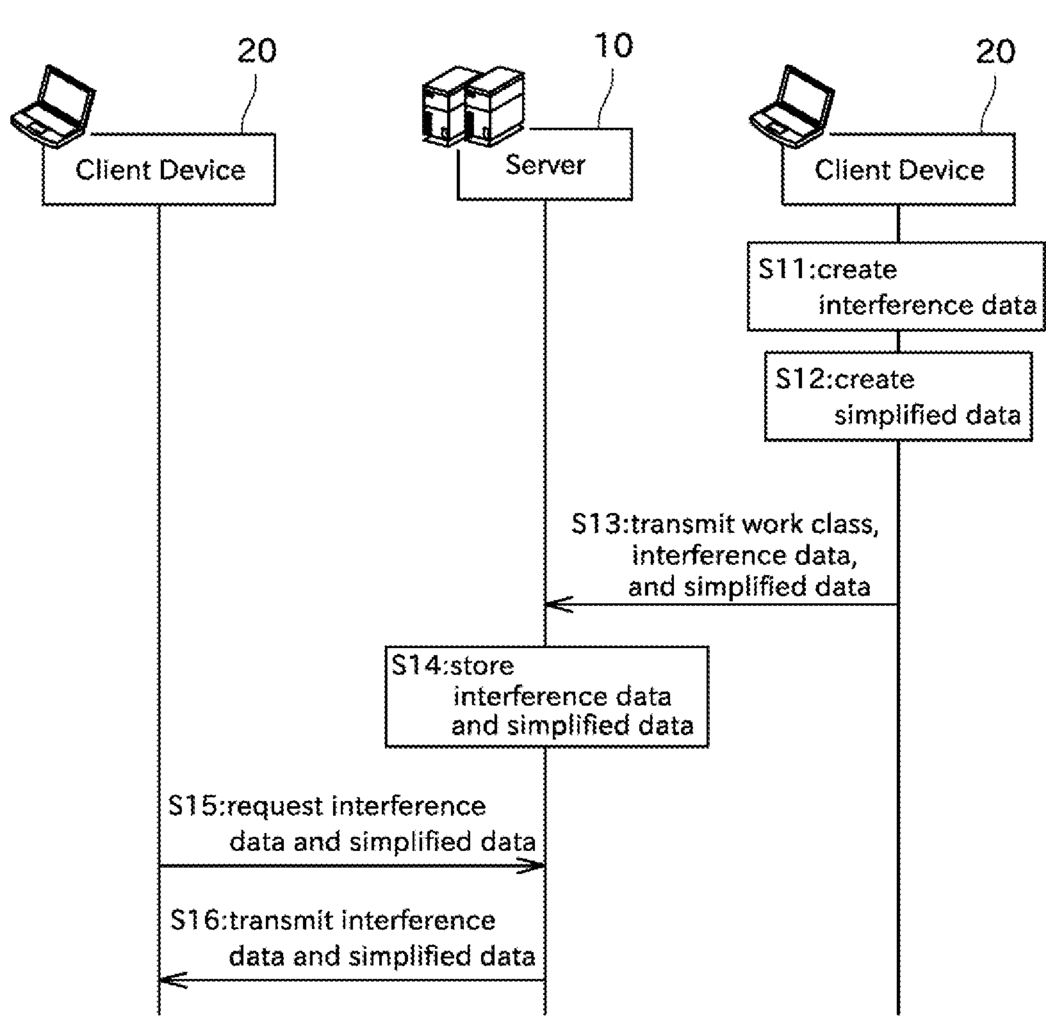

Since S11 to S14 in the sequence diagram of FIG. 7 are the same as S1 to S4 of the sequence diagram of FIG. 3, an explanation of that will be omitted. The interference data and the simplified data stored in the server 10 are shared between the client devices 20. For example, a certain robot user and an introduction support company that supports the robot user belong to the same group. In the same group, the interference data and the simplified data are shared via the server 10. Specifically, the client device 20 requests the interference data and the simplified data to the server 10 (sequence number S15). If the source client device 20 is in the same group as the client device 20 that transmitted the interference data and the simplified data, the server 10 transmits the interference data and simplified data to the client device 20 (sequence number S16). In this way, the interference data and the simplified data can be shared.

A specific method of utilizing the interference data and the simplified data will be explained. For example, as shown in FIG. 2, the robot user transmits the interference data and the simplified data to the server 10. Thereafter, the introduction support company that supports the robot user receives the interference data and the simplified data from the server 10 and transmits, for example, a control program for peripheral equipment to the server 10. A programmer supporting the robot user receives the interference data and the simplified data from the server 10 and transmits, for example, an operation program to the server 10. The robot user receives the control program and the operation program from the server 10 and uses them.

As described above, the interference data and the simplified data include necessary data for creating various programs, but highly confidential part is not included. Therefore, by sharing the interference data and the simplified data as described above, it is possible to improve convenience while suppressing a decrease in security.

As thus far described above, the server 10 of this embodiment includes the communication device 11 and storage device 13. The communication device 11 receives the interference data from the client device 20 connected via the wide area network. The interference data is data which associates teaching point candidates indicating candidates for the teaching points of the industrial robot 42 with interference results indicating whether or not the robot 42 interferes with surrounding objects when the position and posture of the robot 42 is aligned with the teaching point candidate. The storage device 13 stores the interference data received by the communication device 11. In this manner, the interference data providing method is performed.

Since the interference data includes information regarding the operation of the robot 42 and the environment of the workshop, the storing of the interference data in the server 10 enable convenience to be improved. Storing interference data in the server 10 instead of highly confidential three-dimensional data enable security to be maintained.

The server 10 of this embodiment includes the processing unit 12 that creates the operation path of the robot 42 using the interference data received by the communication device 11 by selecting a plurality of the teaching point candidates that do not cause interference and by sequencing the teaching point candidates in time series.

Accordingly, operation path that does not cause interference can be created. In particular, the server 10, not client device 20, creates the operation path. Thus, the operation path is created by utilizing the processing capacity of the server 10, stored data in the server 10, or the like.

The storage device 13 stores the work quality data that associates the operation of the robot 42 with the work quality data of the operation. The processing unit 12 creates the operation path based on the interference data and the work quality data.

Thereby, the server 10 can create the operation path with high work quality.

In the server 10 of this embodiment, the processing unit 12 creates the operation path for the interference data received by the communication device 11 using the operation path model. The operation path model is a model constructed by machine learning at least on the work quality data, input of the operation path model is the interference data, and output of the operation path model is the operation path.

Accordingly, the server 10 can create the operation path that has high work quality and is tailored to the situation of the workshop where the interference data was created.

In the server 10 of this embodiment, the communication device 11 receives the simplified data from the client device 20. The simplified data is three-dimensional data that simplifies the shape of at least one of the objects placed around the robot 42 and the workpiece that is the target of the work of the robot 42. The storage device 13 stores the simplified data received from the client device 20.

By simplification, the amount of three-dimensional data can be reduced, so the communication load can be reduced. If the three-dimensional data includes highly confidential shape, the data is processed so that the confidentiality is not included, so security can be maintained.

In the server 10 of this embodiment, when the simplified data is superimposed on the three-dimensional data of the object or the workpiece, the simplified data includes the three-dimensional data.

Accordingly, if there is no interference with the simplified data, there will also be no interference with the object or the workpiece, so the presence or absence of interference can be examined using the data transmitted to the server 10.

In the server 10 of this embodiment, the communication device 11 transmits at least one of the interference data and the simplified data to another client device 20.

This allows less sensitive data to be shared. Therefore, for example, the work related to the run of the robot can be carried out while sharing non-confidential data among multiple locations or multiple companies.

By simplification, the amount of three-dimensional data can be reduced, so the communication load can be reduced. If the three-dimensional data includes highly confidential shape, the data is processed so that the confidentiality is not included, so security can be maintained.

While a preferred embodiment of the present invention has been described above, the configurations described above may be modified, for example, as follows.

The sequence diagrams illustrated in the embodiment described above is just an example, and it may be acceptable that a part of the process is omitted, contents of a part of the process are changed, or a new process is added.

The server 10 according to the embodiment described above is installed in the data center, but in a case where, for example, the robot manufacturer provides the robot service provider system 1, the server 10 may be installed in the robot manufacturer.

The functionality of the elements disclosed herein may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered as processing circuitry or circuitry as they include transistors and other circuitry therein. In the disclosure, the circuitry, units, or means are hardware that carry out the recited functionality, or are hardware programmed to perform the recited functionality. The hardware may be any hardware disclosed herein or otherwise may be other known hardware which is programmed or configured to carry out the recited functionality. When the hardware is a processor which may be considered as a type of circuitry, the circuitry, means, or units are a combination of hardware and software, the software being used to configure the hardware and/or processor.

The invention claimed is:

1. A robot system comprising:

an industrial robot;

an external device; and a server comprising:

a communication device that receives interference data from the external device connected via a wide area network, the interference data being data which associates teaching point candidates indicating candidates for teaching points of the robot with interference results indicating whether or not the robot interferes with surrounding objects when a position and posture of the robot is aligned with the teaching point candidates, a storage device that stores the interference data received by the communication device, and a processing unit configured to create an operation path of the robot using the interference data by selecting a plurality of the teaching point candidates that do not cause interference and by sequencing the selected teaching point candidates in time series as the teaching points for the operation path, wherein the communication device further receives simplified data from the external device, the simplified data is three-dimensional data that simplifies a shape of at least one object placed around the robot and a workpiece that is a target of a work of the robot, the teaching points forming the operation path are set such that the robot does not interfere with the simplified data, and the processing unit controls the robot according to the operation path formed of the set teaching points.

2. The robot system according to claim 1, wherein the storage device stores work quality data that associates operations of the robot with work quality data of the operations, and the processing unit creates the operation path based on the interference data and the work quality data.

3. The robot system according to claim 2, wherein the processing unit creates the operation path for the interference data received by the communication device using an operation path model, the operation path model is a model constructed by machine learning at least on the work quality data, input of the operation path model is the interference data, and output of the operation path model is the operation path.

4. The robot system according to claim 1, wherein the storage device stores the simplified data received from the external device.

5. The robot system according to claim 1, wherein the simplified data encompasses the three-dimensional data of the object or the workpiece.

6. The robot system according to claim 1, wherein the communication device transmits at least one of the interference data and the simplified data to another external device different from the external device that transmitted the interference data.

7. An interference data provision method comprising:

receiving, by a server, interference data from an external device connected via a wide area network, the interference data being data which associates teaching point candidates indicating candidates for teaching points of an industrial robot with interference results indicating whether or not the robot interferes with surrounding objects when a position and posture of the robot is aligned with the teaching point candidates;

storing, by the server, the interference data received from the external device;

creating, by the server, an operation path of the robot using the interference data by selecting a plurality of the teaching point candidates that do not cause interference and by sequencing the selected teaching point candidates in time series as the teaching points for the operation path;

receiving, by the server, simplified data from the external device, the simplified data being three-dimensional data that simplifies a shape of at least one object placed around the robot and a workpiece that is a target of a work of the robot;

setting, by the server, the teaching points forming the operation path such that the robot does not interfere with the simplified data; and controlling, by the server, the robot according to the operation path formed of the set teaching points.

8. The interference data provision method according to claim 7, further comprising:

storing the simplified data.

* * * * *